United States Patent
Mizuno et al.

(10) Patent No.: US 8,808,930 B2
(45) Date of Patent: Aug. 19, 2014

(54) LIQUID AIR ELECTRODE FOR METAL-AIR BATTERY AND METAL-AIR BATTERY PROVIDED WITH SAME

(75) Inventors: Fuminori Mizuno, Susono (JP); Yukinari Kotani, Gotenba (JP); Kenichi Hamamoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/816,740

(22) PCT Filed: Aug. 12, 2011

(86) PCT No.: PCT/IB2011/001853
§ 371 (c)(1),
(2), (4) Date: Feb. 13, 2013

(87) PCT Pub. No.: WO2012/023019
PCT Pub. Date: Feb. 23, 2012

(65) Prior Publication Data
US 2013/0143134 A1 Jun. 6, 2013

(30) Foreign Application Priority Data
Aug. 17, 2010 (JP) .................................. 2010-182095

(51) Int. Cl.
*H01M 4/36* (2006.01)

(52) U.S. Cl.
USPC ........................................................ 429/405

(58) Field of Classification Search
None
See application file for complete search history.

(56) References Cited

U.S. PATENT DOCUMENTS

2011/0014522 A1* 1/2011 Visco et al. .................... 429/219

FOREIGN PATENT DOCUMENTS

| JP | A-2010-176941 | 8/2010 |
| WO | WO 2011/031372 A1 | 3/2011 |

OTHER PUBLICATIONS

Zhang et al., Novel composite polymer electrolyte for lithium batteries, Journal of Power Sources 195 (2010) 1202-1206.*
Allen et al., Oxygen Electrode Rechargeability in an Ionic Liquid for the Li-Air Battery, J. Phys. Chem. Lett. 2011,2, 2420-2424.*
Zhou et al., "Development of a New-type Lithium-Air Battery with Large Capacity," Feb. 24, 2009, National Institute of Advanced Industrial Science and Technology. (URL:http://www.aist.go.jp/aist_j/press_release/pr2009/pr20090224/pr20090224.html).
Kuboki et al., "Lithium-air batteries using hydrophobic room temperature ionic liquid electrolyte," *Journal of Power Sources*, 2005, pp. 766-769, vol. 146, Elsevier B.V.

* cited by examiner

*Primary Examiner* — Patrick Ryan
*Assistant Examiner* — Jose Colucci Rios
(74) *Attorney, Agent, or Firm* — Oliff PLC

(57) ABSTRACT

Provided are a liquid air electrode for a metal-air battery that has superior discharge capacity and includes an electrolyte solution and an electrically conductive material, the electrically conductive material being dispersed in the electrolyte solution, and a metal-air battery that includes the liquid air electrode.

17 Claims, 1 Drawing Sheet

LIQUID AIR ELECTRODE FOR METAL-AIR BATTERY AND METAL-AIR BATTERY PROVIDED WITH SAME

INCORPORATION BY REFERENCE

The disclosure of Japanese Patent Application No. 2010-182095 filed on Aug. 17, 2010, including the specification, drawings and abstract is incorporated herein by reference in its entirety.

BACKGROUND OF THE INVENTION

1. Field of the Invention

The invention relates to a liquid air electrode having superior discharge capacity when incorporated in a metal-air battery, and a metal-air battery provided with the liquid air electrode.

2. Description of Related Art

Metal-air batteries are rechargeable batteries that use an elemental metal or metal oxide for the negative electrode active material and oxygen for the positive electrode active material. Since oxygen used for the positive electrode active material is obtained from the air, and it is therefore not necessary to seal the positive electrode active material in the battery, metal-air batteries are theoretically able to realize greater capacity than secondary batteries using a solid positive electrode active material.

In a lithium-air battery, which is one type of metal-air battery, the reaction of the following formula (I) proceeds at the negative electrode during discharge.

$$2Li \rightarrow 2Li^+ + 2e^- \tag{I}$$

Electrons generated in formula (I) perform work in an external load via an external circuit, after which they reach the air electrode. Lithium ions ($Li^+$) generated in formula (I) migrate within an electrolyte retained between the negative electrode and the air electrode from the negative electrode side to the air electrode side by electroosmosis.

In addition, the reactions of the following formulas (II) and (III) proceed at the air electrode during discharge.

$$2Li^+ + O_2 + 2e^- \rightarrow Li_2O_2 \tag{II}$$

$$2Li^+ + \tfrac{1}{2}O_2 + 2e^- \rightarrow Li_2O \tag{III}$$

The generated lithium peroxide ($Li_2O_2$) and lithium oxide ($LiO_2$) accumulate on the air electrode as a solid. During charging, the reverse reaction of formula (I) proceeds at the negative electrode, while the reverse reactions of formulas (II) and (III) proceed at the air electrode, thereby causing metal lithium to be regenerated at the negative electrode and enabling redischarging.

Conventional metal-air batteries were typically provided with a layer configuration consisting of a metal solid negative electrode, electrolyte solution and solid air electrode. In this type of conventional metal-air battery, a solid composed of the reaction products of formulas (II) and (III) in the form of lithium peroxide ($Li_2O_2$) and lithium oxide ($LiO_2$) accumulate on the air electrode, and as a result thereof, the air electrode becomes clogged and contact between the electrolyte solution and the air is interrupted, resulting in the problem of impairment of charging and discharging. In addition, there were restrictions on the electrolyte solution that can be used due to the nature of the battery. Moreover, countermeasures were also required against moisture and carbon dioxide gas entering primarily from the air electrode. It was also difficult to recycle battery materials. In view of these problems associated with conventional metal-air batteries, the following non-patent document discloses a technology for a lithium-air battery that attempts to resolve the problem of solid precipitation on the air electrode in particular. This technology attempts to prevent precipitation of lithium oxide ($LiO_2$), which is the solid reaction product at the air electrode, by arranging an organic electrolyte solution between a lithium ion-conducting solid electrolyte and a negative electrode and arranging an aqueous electrolyte solution between the electrolyte and the air electrode.

See Zhou Haoshen and 1 other, "Development of a New-type Lithium-Air Battery with Large Capacity", [Online], Feb. 24, 2009, National Institute of Advanced Industrial Science and Technology, search date: Aug. 17, 2010, Internet. (URL:http://www.aist.go.jp/aist_j/press_release/pr2009/pr20090224/pr20090224.html)

The reaction of formula (IV) is thought to proceed at the negative electrode during discharge in the lithium-air battery disclosed in this document.

$$Li \rightarrow Li^+ + e^- \tag{IV}$$

According to formula (IV), metal lithium Li begins to dissolve in an organic electrolyte solution as lithium ions $Li^+$ and electrons are supplied to a lead. The dissolved lithium ions $Li^+$ migrate to the aqueous electrolyte solution on the air electrode side after passing through the solid electrolyte.

On the other hand, in this lithium-air battery, the reaction of formula (V) proceeds at the air electrode during discharge.

$$O_2 + 2H_2O + 4e^- \rightarrow 4OH^- \tag{V}$$

According to formula (V), electrons are supplied from a lead, and oxygen in the air reacts with water on the surface of the air electrode resulting in the formation of hydroxide ions $OH^-$. These hydroxide ions $OH^-$ encounter lithium ions $Li^+$ generated in the above-mentioned formula (IV) in the aqueous electrolyte solution on the air electrode side resulting in the formation of water-soluble lithium hydroxide LiOH.

In the lithium-air battery disclosed in the above-mentioned non-patent document, the discharge reaction proceeds accompanied by consumption of water ($H_2O$). Thus, although it is necessarily to preliminarily store a large amount of water in the battery in order to improve discharge capacity, this results in the shortcoming of a relative decrease in the energy density of the battery.

SUMMARY OF THE INVENTION

With the foregoing in view, the invention provides a liquid air electrode having superior discharge capacity when incorporated in a metal-air battery, and a metal-air battery provided with the liquid air electrode.

According to a first aspect of the invention, a liquid air electrode for a metal-air battery is provided that contains an electrolyte solution and an electrically conductive material, and the electrically conductive material is dispersed in the electrolyte solution.

The liquid air electrode for a metal-air battery of the invention preferably contains 5 parts by mass to 150 parts by mass of the electrolyte solution to 1 part by mass of the electrically conductive material. Moreover, the liquid air electrode more preferably contains 5 parts by mass to 60 parts by mass of the electrolyte solution to 1 part by mass of the electrically conductive material.

In addition, in the liquid air electrode for a metal-air battery, the content ratio of the electrically conductive material in the liquid air electrode is preferably 0.4% by mass to 30% by mass. Moreover, the content ratio of the electrically conductive material in the liquid air electrode is more preferably 0.5% by mass to 20% by mass.

In addition, the liquid air electrode for a metal-air battery preferably also contains an air electrode catalyst that has an ability to reduce oxygen. At this time, the content ratio of the air electrode catalyst in the liquid air electrode is preferably 1% by mass to 90% by mass. Moreover, the content ratio of the air electrode catalyst in the liquid air electrode is more preferably 5% by mass to 50% by mass.

In addition, the liquid air electrode for a metal-air battery preferably also contains a binder that immobilizes the electrically conductive material. At this time, the content ratio of the binder in the liquid air electrode is preferably 40% by mass or less. Moreover, the content ratio of the binder in the liquid air electrode is more preferably 1% by mass to 30% by mass.

In addition, in the liquid air electrode for a metal-air battery, the electrolyte solution preferably contains a metal salt and an ionic liquid.

According to a second aspect of the invention, a metal-air battery is provided that is at least provided with an air electrode, a negative electrode, and a solid electrolyte interposed between the air electrode and the negative electrode, and the air electrode is the above-mentioned liquid air electrode for a metal-air battery.

According to the invention, differing from the case of providing a conventional solid air electrode, charging and discharging can be carried out without consuming a large amount of water when incorporated in a metal-air battery. In addition, according to the invention, since the air electrode differs from a conventional solid air electrode in that it is a liquid air electrode, clogging by metal oxides that occurs in conventional solid air electrodes does not occur when incorporated in a metal-air battery, thereby making it possible to prevent sudden deterioration of the air electrode. Moreover, according to the invention, since the air electrode differs from a conventional solid air electrode in that it is a liquid air electrode, the supply and diffusion of metal ions and oxidant gases such as air or oxygen occur smoothly when incorporated in a metal-air battery, thereby making it possible to further improve battery characteristics in comparison with the case of using a conventional solid air electrode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
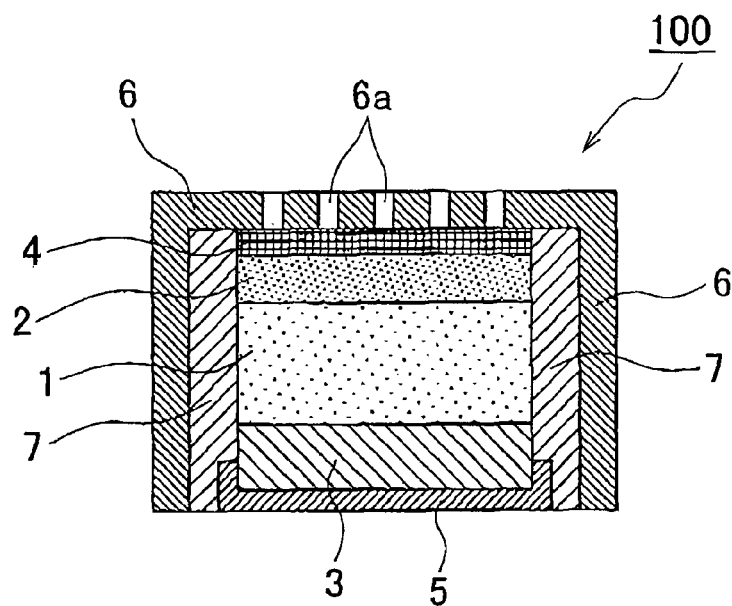
FIG. 1 is a drawing schematically showing a cross-sectional view sectioned in the direction of lamination of the layer configuration of an embodiment of a metal-air battery according to the invention.

The following provides an explanation of a liquid air electrode for a metal-air battery of an embodiment of the invention. The liquid air electrode for a metal-air battery of the embodiment contains an electrolyte solution and an electrically conductive material, and the electrically conductive material is dispersed in the electrolyte solution.

A "liquid air electrode" as referred to in the invention indicates an air electrode provided with a liquid layer in contact with a solid electrolyte and involved in the reactions of the above-mentioned formulas (II) and (III) during battery discharge when incorporated in a metal-air battery (this layer is to be referred to as a liquid air electrode layer). Thus, as will be subsequently described, the liquid air electrode for a metal-air battery according to the invention (to also be referred to as a liquid air electrode according to the invention) may be further provided with a solid air electrode current collector and an air electrode lead connected to the air electrode current collector in addition to the liquid air electrode layer. The following provides an explanation of the liquid air electrode layer and the air electrode current collector in that order.

The liquid air electrode layer in the air electrode for a metal-air battery according to the invention contains an electrolyte solution and an electrically conductive material. The electrically conductive material is dispersed in the electrolyte solution.

There are no particular limitations on the electrolyte solution used in the liquid air electrode layer provided it has the ability to conduct metal ions. Specific examples of the electrolyte solution used in the invention include ionic liquids and non-aqueous electrolytes. Among these, ionic liquids are used preferably. In addition, the more stable the electrolyte solution is to oxygen radicals the better.

The ionic liquid may be used alone or may be used after mixing with a metal salt, aqueous electrolyte or non-aqueous electrolyte to be subsequently described.

The use of an electrolyte solution obtained by mixing an ionic liquid and a metal salt is particularly preferable. Furthermore, an ionic liquid refers to a substance that is composed only of ionic molecules combining a cation and anion and is a liquid at normal temperatures (15° C. to 25° C.).

Examples cation species of the ionic liquid able to be used in the invention include imidazolium species such as 2-ethylimidazolium, 3-propylimidazolium, 1-ethyl-3-methylimidazolium, 1-butyl-3-methylimidazolium or 1,3-dimethylimidazolium, ammonium species such as diethylmethylammonium, tetrabutylammonium, cyclohexyltrimethylammonium, methyltri-n-octylammonium, triethyl (2-methoxyethoxy-methyl)ammonium, benzyldimethyltetradecylammonium, benzyltrimethylammonium, N,N,N-trimethyl-N-propylammonium or N,N-diethyl-N-methyl-N-(2-methoxyethyl)ammonium, pyrrolidinium species such as N-methyl-N-propylpyrrolidinium or N-butyl-N-methylpyrrolidinium, piperidinium species such as N-methyl-N-propylpiperidinium, tetraalkylphosphonium species and trialkylsulfonium species.

Examples of anion species of the ionic liquid able to be used in the invention include halide anions such as $Cl^-$, $Br^-$ or $I^-$, boride anions such as $BF_4^-$, $B(CN)_4^-$ or $B(C_2O_4)_2^-$, amide anions or imide anions such as $(CN)_2N^-$, $[N(CF_3)_2]^-$ or $[N(SO_2CF_3)_2]^-$, sulfate anions or sulfonate ions such as $RSO_3^-$ (wherein, R represents an aliphatic hydrocarbon group or aromatic hydrocarbon group), $RSO_4^-$, $R^fSO_3^-$ (wherein, $R^f$ represents a fluorine-containing halogenated hydrocarbon) or $R^fSO_4^-$, phosphate anions such as $R^f_2P(O)O^-$, $PF_6^-$ or $R^f_3PF_3^-$, antimony ions such as $SbF_6^-$, as well as lactates, nitrate ions and trifluoroacetates.

A metal salt may be dissolved in the ionic liquid. The following lists examples of metal salts (lithium salts) in the case the liquid air electrode according to the invention is form a lithium air battery. Lithium salts are salts composed of a lithium ion and an anion listed above, examples of which include inorganic lithium salts such as $LiPF_6$, $LiBF_4$, $LiClO_4$ or LiAsF$_6$, and organic lithium salts such as LiCF$_3$SO$_3$, LiN(SO$_2$CF$_3$)$_2$, (Li-TFSI), LiN(SO$_2$C$_2$F$_5$)$_2$ and LiC(SO$_2$CF$_3$)$_3$. Two or more types of these metal salts may also be used in combination. In addition, although there are no particular limitations on the amount of metal salt added to the ionic liquid, it is preferably about 0.1 mol/kg to 1 mol/kg.

A non-aqueous electrolyte solution and non-aqueous gel electrolyte can be used for the non-aqueous electrolyte. The following lists examples of non-aqueous electrolyte solutions in the case the air liquid electrode according to the invention is used for a lithium air battery. The non-aqueous electrolyte solution used in the invention contains the above-mentioned lithium salt and a non-aqueous solvent. Examples of non-aqueous solvents include solvents that are stable with respect to oxygen radicals such as acetonitrile, dimethylsulfoxide, ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, dimethoxyethane, 1,2-dimethoxyethane, 1,3-dimethoxypropane, diethyl ether, tetraethylene glycol dimethyl ether (TEGDME), tetrahydrofuran, 2-methyltetrahydrofuran or mixtures thereof. In addition, from the viewpoint of enabling dissolved oxygen to be efficiently used in the reaction, the non-aqueous solvent is preferably a solvent having high oxygen solubility. The concentration of the lithium salt in the non-aqueous electrolyte solution is within the range of, for example, 0.5 mol/L to 3 mol/L.

In addition, the non-aqueous gel electrolyte used in the invention is normally obtained by adding a polymer to a non-aqueous electrolyte solution and gelling. The non-aqueous gel electrolyte can be obtained by adding a polymer such as polyethylene oxide (PEO), polyacrylonitrile (PAN) or polymethylmethacrylate (PMMA) to the non-aqueous electrolyte solution described above followed by gelling. In the invention, an LiTFSI (LiN(CF$_3$SO$_2$)$_2$)—PEO-based non-aqueous gel electrolyte is preferable.

An aqueous electrolyte solution containing a metal salt in water is normally used for the aqueous electrolyte solution used in the invention. Examples of metal salts (lithium salts) in the case the liquid air electrode according to the invention is used for a lithium air battery include lithium salts such as LiOH, LiCl, LiNO$_3$ or CH$_3$CO$_2$Li.

A solid electrolyte can be further used by mixing into the above-mentioned aqueous electrolyte or non-aqueous electrolyte. Examples of solid electrolytes that can be used include Li—La—Ti—O-based solid electrolytes.

The content of the electrolyte solution in the liquid air electrode layer is preferably 5 parts by mass to 150 parts by mass to 1 part by mass of the electrically conductive material to be subsequently described. In the case the content of the electrolyte solution is less than 5 parts by mass, the fluidity of the liquid air electrode layer decreases and it becomes difficult to adequately demonstrate the effects of the invention. In addition, in the case the content of the electrolyte solution exceeds 150 parts by mass, since it becomes difficult to achieve contact between the electrically conductive material resulting in difficulty in forming electrically conductive pathways, in the case of incorporating the liquid air electrode according to the invention in a metal-air battery, there is the risk of being unable to obtain adequate discharge time. The content of the electrolyte solution in the liquid air electrode layer is more preferably 5 parts by mass to 100 parts by mass, and even more preferably 5 parts by mass to 60 parts by mass, to 1 part by mass of the electrically conductive material to be subsequently described.

Although there are no particular limitations on the electrically conductive material used in the liquid air electrode layer provided it has electrical conductivity, examples thereof include carbon materials, perovskite electrically conductive materials, porous electrically conductive polymers and metal porous bodies. In particular, although carbon materials may or may not have a porous structure, carbon materials preferably have a porous structure in the invention. This is because the use of a porous structure results in greater specific surface area, thereby making it possible to provide numerous reaction fields. A specific example of a carbon material having a porous structure is mesoporous carbon. On the other hand, specific examples of carbon materials not having a porous structure include carbon materials having a high specific surface area such as graphite, acetylene black, carbon nanotubes, carbon fibers and active carbon. The content ratio of the electrically conductive material in the liquid air electrode layer is preferably 0.4% by mass to 30% by mass and more preferably 0.5% by mass to 20% by mass based on a value of 100% by mass for the mass of the entire liquid air electrode layer. If the content ratio of the electrically conductive material is excessively low, the number of reaction fields decrease thereby resulting in the possibility of a decrease in battery capacity, while if the content ratio of the electrically conductive material is excessively high, there is the risk of being unable to maintain the fluidity of the liquid air electrode layer.

Although the liquid air electrode layer at least contains the electrolyte solution and the electrically conductive material, it may also contain an air electrode catalyst having the ability to reduce oxygen and a binder that immobilizes the electrically conductive material. Examples of oxygen reduction catalysts include members of the platinum family such as nickel, palladium or platinum, precious metals such as silver or gold, perovskite oxides containing a transition metal such as cobalt, manganese or iron, inorganic compounds containing a precious metal oxide such as ruthenium, iridium or palladium, metal-coordinated organic compounds having a porphyrin backbone or phthalocyanine backbone, inorganic ceramics such as manganese dioxide (MnO$_2$) or cerium oxide (CeO$_2$), and composite materials consisting of a mixture of these materials. The content ratio of the air electrode catalyst in the liquid air electrode layer is preferably 1% by mass to 90% by mass and more preferably 5% by mass to 50% by mass based on a value of 100% by mass for the mass of the electrically conducive material in the liquid air electrode layer. If the content ratio of the air electrode catalyst is excessively low, there is the risk of being unable to demonstrate adequate catalytic function, while if the content ratio of the air electrode catalyst is excessively high, there is the risk of being unable to maintain the fluidity of the liquid air electrode layer. From the viewpoint of allowing the electrode reactions to proceed more smoothly, the catalysts are preferably supported on the electrically conductive material.

Examples of binders include rubber-based resins such as polyvinylidene fluoride (PVdF), polytetrafluoroethylene (PTFE) or styrene-butadiene rubber (SBR). Although there are no particular limitations thereon, the content ratio of the binder in the liquid air electrode layer is preferably 40% by weight-mass or less and more preferably 1% by mass to 30% by mass based on a value of 100% by mass for the mass of the electrically conductive material in the liquid air electrode layer.

The liquid air electrode layer is formed by coating an air electrode mixture, obtained by at least mixing an electrolyte solution, electrically conductive material, and as necessary, a binder, onto a support such as an air electrode current collector to be subsequently described. A solvent may be used to prepare the air electrode mixture. A solvent having a boiling point of 200° C. or lower is preferable for the solvent used to prepare the air electrode mixture, and examples of solvents that can be used include acetone, N,N-dimethylformamide (DMF) and N-methyl-2-pyrrolidone (NMP).

Although varying according to the application and the like of the air battery, the thickness of the liquid air electrode layer is, for example, within the range of 2 μm to 500 μm, and is preferably within the range of 5 μm to 300 μm.

The air electrode current collector in the air electrode for a metal-air battery according to the invention carries out current collection of the air electrode layer. Although there are no particular limitations on the material of the air electrode current collector provided it has electrical conductivity, examples of materials include stainless steel, nickel, aluminum, iron, titanium and carbon. Examples of air electrode current collectors include foil-like current collectors, plate-like current collectors, porous current collectors, fibrous current collectors, non-woven fabric current collectors and mesh (grid)-like current collectors. In the invention in particular, carbon paper and mesh-like current collectors are preferable from the viewpoint of having superior current collection efficiency. Among these, in the case of using a mesh-like current collector, a mesh-like air electrode current collector is normally arranged inside the air electrode layer. Moreover, the air electrode for a metal-air battery according to the invention may also have another air electrode current collector (such as a foil-like current collector) that collects charge accumulated by the mesh-like air electrode current collector. In addition, in the invention, a battery case to be subsequently described may also be provided with the function of an air electrode current collector. The thickness of the air electrode current collector is, for example, preferably within the range of 10 μm to 1000 μm and particularly preferably within the range of 20 μm to 400 μm.

The metal-air battery of the invention is a metal-air battery at least provided with an air electrode, a negative electrode, and a solid electrolyte interposed between the air electrode and the negative electrode, and the air electrode is the previously described liquid air electrode for a metal-air battery.

The metal-air battery according to the invention has a negative electrode and a liquid air electrode separated by a solid electrolyte. Thus, the metal-air battery can be used even in the case of a liquid air electrode that reacts with the negative electrode, thereby making it possible to increase the selection of liquid air electrodes, and particularly the electrolyte solutions in the liquid air electrode, that can be used. An example of the electrolyte solution is an electrolyte solution that is unstable with respect to the negative electrode, but stable with respect to oxygen radicals. In addition, in the metal-air battery according to the invention, since the negative electrode is protected from the liquid air electrode by the solid electrolyte, the negative electrode is protected from impurities such as moisture and carbon dioxide that have entered from the outside, thereby making it possible to extend the life of the negative electrode.

FIG. 1 is a drawing schematically showing a cross-sectional view sectioned in the direction of lamination of an example of the layer configuration of the metal-air battery according to the invention. Furthermore, the metal-air battery according to the invention is not necessarily limited to this example. A metal-air battery 100 is provided with a liquid air electrode 2 according to the invention. The liquid air electrode 2 opposes a negative electrode active material 3 with a solid electrolyte 1 interposed there between. A metal mesh 4 is provided on the opposite side of the liquid air electrode 2 from the side that faces the solid electrolyte 1 in order to hold the liquid air electrode 2. The negative electrode active material 3, the solid electrolyte 1, the liquid air electrode 2 and the metal mesh 4 are housed in a negative electrode container 5 and an air electrode container 6. A plurality of air holes 6a are provided in the surface of the air electrode container 6 that contacts the metal mesh 4. Furthermore, the air electrode container 6 is separated from members other than the metal mesh 4 by gasket 7 for maintaining airtightness in the battery. The liquid air electrode in the metal-air battery according to the invention is as was previously described. The following provides a detailed explanation of other constituents of the metal-air battery according to the invention consisting of the negative electrode, solid electrolyte, and a separator and battery case preferably used in the invention.

The negative electrode in the metal-air battery according to the invention is preferably provided with a negative electrode layer containing the negative electrode active material, and is normally additionally provided with a negative electrode current collector and a negative electrode lead connected to the negative electrode current collector.

The negative electrode layer in the metal-air battery according to the invention contains a negative electrode active material containing a metal and an alloy material. Specific examples of metals and alloy materials that can be used in the negative electrode active material include alkaline metals such as lithium, sodium or potassium, group 2 elements such as magnesium or calcium, group 13 elements such as aluminum, transition metals such as zinc or iron, and alloy materials and compounds containing these metals. Examples of alloys containing elemental lithium include lithium-aluminum alloys, lithium-tin alloys, lithium-lead alloys and lithium-silicon alloys. In addition, examples of metal oxides containing elemental lithium include lithium titanium oxide. In addition, examples of metal nitrides containing elemental lithium include lithium cobalt nitride, lithium iron nitride and lithium manganese nitride. In addition, lithium coated with a solid electrolyte can also be used in the negative electrode.

In addition, the negative electrode layer may contain only a negative electrode active material, or may contain at least one of an electrically conductive material and binder in addition to the negative electrode active material. For example, in the case the negative electrode active material is in the form of a foil, the negative electrode layer can be that which only contains a negative electrode active material. On the other hand, in the case the negative electrode active material is in the form of a powder, the negative electrode layer can be that which contains the negative electrode active material and a binder. Furthermore, an explanation of the electrically conductive material and the binder is omitted here since they are the same as those previously described in the section describing the air electrode.

Although there are no particular limitations on the material of the negative electrode current collector in the metal-air battery according to the invention provided it has electrical conductivity, examples of materials include copper, stainless steel, nickel and carbon. Examples of the form of the negative electrode current collector include foil, plate and mesh (grid) forms. In the invention, the battery case to be subsequently described may also be provided with the function of a negative electrode current collector.

The solid electrolyte in the metal-air battery according to the invention is interposed between the liquid air electrode layer and the negative electrode layer, and has the function of exchanging metal ions between the liquid air electrode layer and the negative electrode layer. There are no particular limitations on the solid electrolyte able to be used in the present provided it is, for example, a gel, polymer, quasi-solid or solid that has the ability to conduct metal ions. From the viewpoints of permeating the liquid air electrode as previously described and being able to prevent dispersion of impurities such as moisture or carbon dioxide, the solid electrolyte able to be used in the invention is preferably an inorganic solid electrolyte. In the case the metal-air battery according to the invention is a lithium air battery that uses lithium ions as carriers, a solid electrolyte that is stable with respect to lithium metal and has superior moisture resistance is used preferably. In the invention, a solid electrolyte may be used that is composed of two layers consisting of a solid electrolyte layer having the property of being stable with respect to lithium metal and a solid electrolyte layer having superior moisture resistance. In this case, the solid electrolyte layer having the property of being stable with respect to lithium metal is preferably arranged on the negative electrode side, while the solid electrolyte layer having superior moisture resistance is preferably arranged on the air electrode side.

Among solid electrolytes composed of two layers as described above, the solid electrolyte having superior moisture resistance is preferably a solid oxide catalyst in view of the high level of chemical stability required. Specific examples of solid oxide electrolytes include perovskite-type oxides such as Li—La—Ti—O-based oxides, NASICON-type oxides such as Li—Al—Ti—P—O-based oxides and Li—Al—Ge—Ti—O-based oxides, LISICON-type oxides such as $Li_3PO_4$—$Li_4SiO_4$-based oxides and $Li_3PO_4$—$Li_3BO_3$-based oxides, garnet-type oxides such as Li—La—Zr—O-based oxides, and LiPON (lithium phosphorous oxynitride).

Among solid electrolytes composed of two layers as described above, there are no particular limitations on the solid electrolyte having the property of being stable with respect to lithium metal provided is a solid electrolyte normally used in metal-air batteries. Specific examples of solid electrolytes having the property of being stable with respect to lithium metal include the above-mentioned non-aqueous electrolytes and solid oxide electrolytes (excluding NASICON-type oxides), and solid sulfide electrolytes. In addition, a solid electrolyte obtained by impregnating a non-aqueous electrolyte solution into a base material used for a separator to be subsequently can also be used as a solid electrolyte. The following lists examples of solid sulfide electrolytes in the case the metal-air battery according to the invention is a lithium air battery. Specific examples of solid sulfide electrolytes include $Li_2S$—$P_2S_5$ ($Li_2S:P_2S_5$=50:50 to 100:0), $Li_2S$—$SiS_2$, $Li_{3.25}P_{0.25}Ge_{0.76}S_4$, $Li_2O$—$Li_2S$—$P_2S_5$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—ZmSn (Z=Ge, Zn, Ga), $Li_2S$—$GeS_2$, $Li_2S$—$SiS_2$—$Li_3PO_4$ and $Li_2S$—$SiS_2$—$Li_xMO_y$ (M=P, Si, Ge, B, Al, Ga, In).

The negative electrode and the solid electrolyte are preferably joined prior to use. This enables the battery to be reused simply by replacing the liquid air electrode when disposing of the battery, thereby facilitating recycling. A conventionally used method can be used to join the negative electrode and solid electrolyte.

A separator can be provided in a portion of the battery according to the invention. Examples of the separator include porous films made of polyethylene or polypropylene, and non-woven fabrics such as a resin non-woven fabric or glass fiber non-woven fabric.

The metal-air battery according to the invention normally has a battery case that houses the liquid air electrode, negative electrode, solid electrolyte and the like. Specific examples of the shape of the battery case include a coin shape, flat shape, cylindrical shape and laminated shape. The battery case may be a battery case that is open to the atmosphere or a sealed battery case. A battery case that is open to the atmosphere is a battery case having a structure that at least allows the liquid air electrode to adequately contact the atmosphere. On the other hand, in the case the battery case is a sealed battery case, a gas (air) introduction tube and venting tube are preferably provided in the sealed battery case. In this case, the gas that is introduced and vented preferably has a high oxygen concentration, and is more preferably pure oxygen. In addition, the oxygen concentration is preferably increased during discharge and decreased during charging.

The following provides an explanation of each of the examples.

In Example 1, ketjen black (ECP600JD) for use as an electrically conductive material, and a solution obtained by dissolving lithium bis(trifluoromethane-sulfonyl) imide in N-methyl-N-propylpiperidinium bis(trifluoromethanesulfonyl) imide to a concentration of 0.32 mol/kg for use as an electrolyte solution were first prepared. The electrically conductive material and the electrolyte solution were mixed to a mass ratio of electrically conductive material to electrolyte solution of 1:10 to prepare an air electrode paste.

A mesh made of SUS304 was prepared for use as an air electrode current collector. In addition, an SUS plate was prepared for use as a negative electrode current collector, and metal lithium was laminated into one side of the SUS plate to prepare a negative electrode. A lithium ion-conducting solid electrolyte (OHARA Corp.) and a glass filter impregnated with the above-mentioned electrolyte were respectively prepared for use as an electrolyte layer. The negative electrode current collector, metal lithium, electrolyte-impregnated glass filter, lithium ion-conducting solid electrode, air electrode paste and air electrode current collector were laminated in that order and interposed between the air electrode and negative electrode to produce the metal-air battery of Example 1. All of the above steps were carried out in a glove box containing a nitrogen atmosphere.

Next, with respect to Example 2, the metal-air battery of Example 2 was produced in the same manner as Example 1 with the exception of mixing the electrically conductive material and the electrolyte so that the mass ratio of the electrically conductive material to the electrolyte was 1:20 in the air electrode paste preparation step of Example 1.

Next, with respect to Example 3, the metal-air battery of Example 3 was produced in the same manner as Example 1 with the exception of mixing the electrically conductive material and the electrolyte so that the mass ratio of the electrically conductive material to the electrolyte was 1:60 in the air electrode paste preparation step of Example 1.

Next, with respect to Example 4, the metal-air battery of Example 4 was produced in the same manner as Example 1 with the exception of mixing the electrically conductive material and the electrolyte so that the mass ratio of the electrically conductive material to the electrolyte was 1:100 in the air electrode paste preparation step of Example 1.

In contrast to each of the above-mentioned examples, ketjen black (ECP600JD) for use as an electrically conductive material, PVdF for use as a binder, and the same electrolyte solution as Example 1 for use as an electrolyte, were first respectively prepared for Comparative Example 1. The electrically conductive material, binder and electrolyte solution were mixed so that the mass ratio of the electrically conductive material to the binder to the electrolyte solution was 30:15:55 to prepare an air electrode paste. Carbon paper was prepared for use as an air electrode current collector. The air electrode paste was coated onto the carbon paper and dried to produce a solid air electrode. Subsequently, the negative electrode and electrolyte layer were prepared in the same manner as Example 1 to produce the metal-air battery of Comparative Example 1.

Measurement of Initial Discharge Times of Metal-Air Batteries

Electrochemical measurements were carried out on the metal-air batteries of Examples 1 to 4 and Comparative Example 1 to measure the initial discharge times thereof. Details of the measurement conditions are described below.

Measuring instrument: Charge/Discharge Tester (Nagano, Ltd., Product No. BTS2004H)

Measuring conditions: 0.02 mA/cm$^2$, 60° C., 2.2 V cutoff (termination of discharge)

Figure 2:
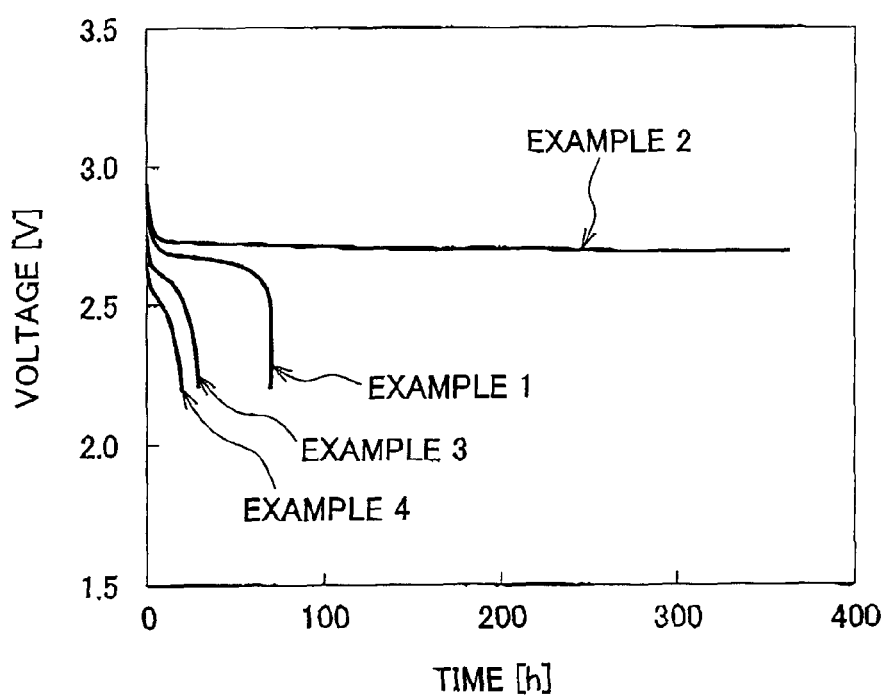
FIG. 2 is a graph showing discharge characteristics of Examples 1 to 4 in the form of discharge curves in which voltage is plotted on the vertical axis and discharge time is plotted on the horizontal axis.

FIG. 2 is a graph showing discharge curves of Examples 1 to 4 in which voltage (V) is plotted on the vertical axis and discharge time (h) is plotted on the horizontal axis. In addition, the following Table 1 summarizes the initial discharge times of the metal-air batteries of Examples 1 to 4 and Comparative Example 1.

TABLE 1

|  | Initial Discharge Time (h) |
|---|---|
| Example 1 | 70.2 |
| Example 2 | >350 |
| Example 3 | 30.6 |
| Example 4 | 20.6 |
| Comparative Example 1 | 2 |

As can be seen from Table 1, hardly any discharge occurred in Comparative Example 1 that employed a solid air electrode layer. This is thought to be the result of the interfacial resistance at the interface between the solid air electrode layer and the solid electrolyte being excessively high. On the other hand, in the metal-air batteries of Examples 1 to 4, the electrode reaction field was able to be controlled by adjusting the mixing ratio of the electrically conductive material and the electrolyte solution, thereby making it possible to increase initial discharge time. In the metal-air electrode battery of Example 2 in particular in which the electrically conductive material and the electrolyte solution were incorporated at a ratio of 1:20, initial discharge time exceeded 350 hours. In addition, all of the metal-air batteries of Examples 1 to 4 were able to be confirmed to be able to be charged after discharging, thereby confirming the production of repeatedly rechargeable secondary batteries. Moreover, in the metal-air batteries of Examples 1 to 4, entrance of moisture and carbon dioxide from the outside was improved considerably as compared with conventional metal-air batteries using a liquid electrolyte, and degeneration of metal lithium used for the negative electrode was not observed.

The invention claimed is:

1. A liquid air electrode for a metal-air battery, comprising:
a liquid layer having an electrolyte solution and an electrically conductive material,
the electrically conductive material being dispersed in the electrolyte solution, the liquid air electrode being in contact with a solid electrolyte when incorporated in a metal-air battery, and the liquid layer being involved in reactions of following formulas (II) and (III) during discharge of the metal-air battery $$2Li^+ + O_2 + 2e^- \rightarrow Li_2O_2 \quad (II)$$

$$2Li^+ + \tfrac{1}{2}O_2 + 2e^- \rightarrow Li_2O \quad (III),$$

wherein the liquid air electrode contains 5 parts by mass to 150 parts by mass of the electrolyte solution to 1 part by mass of the electrically conductive material.

2. The liquid air electrode for a metal-air battery according to claim 1, wherein the liquid air electrode contains 5 parts by mass to 60 parts by mass of the electrolyte solution to 1 part by mass of the electrically conductive material.

3. A liquid air electrode for a metal-air battery, comprising:
a liquid layer having an electrolyte solution and an electrically conductive material,
the electrically conductive material being dispersed in the electrolyte solution, the liquid air electrode being in contact with a solid electrolyte when incorporated in a metal-air battery, and the liquid layer being involved in reactions of following formulas (II) and (III) during discharge of the metal-air battery $$2Li^+ + O_2 + 2e^- \rightarrow Li_2O_2 \quad (II)$$

$$2Li^+ + \tfrac{1}{2}O_2 + 2e^- \rightarrow Li_2O \quad (III),$$

wherein the content of the electrically conductive material in the liquid air electrode is 0.4% by mass to 30% by mass.

4. The liquid air electrode for a metal-air battery according to claim 3, wherein the content of the electrically conductive material in the liquid air electrode is 0.5% by mass to 20% by mass.

5. The liquid air electrode for a metal-air battery according to claim 1, further comprising:
an air electrode catalyst having an ability to reduce oxygen.

6. The liquid air electrode for a metal-air battery according to claim 5, wherein the content of the air electrode catalyst in the liquid air electrode is 1% by mass to 90% by mass.

7. The liquid air electrode for a metal-air battery according to claim 6, wherein the content of the air electrode catalyst in the liquid air electrode is 5% by mass to 50% by mass.

8. The liquid air electrode for a metal-air battery according to claim 1, further comprising:
a binder.

9. The liquid air electrode for a metal-air battery according to claim 8, wherein the content of the binder in the liquid air electrode is 40% by mass or less.

10. The liquid air electrode for a metal-air battery according to claim 9, wherein the content of the binder in the liquid air electrode is 1% by mass to 30% by mass.

11. The liquid air electrode for a metal-air battery according to claim 1, wherein the electrolyte solution contains a metal salt and an ionic liquid.

12. A metal-air battery comprising
an air electrode, the air electrode being the liquid air electrode for a metal-air battery according to claim 1;
a negative electrode; and
a solid electrolyte interposed between the air electrode and the negative electrode.

13. The liquid air electrode for a metal-air battery according to claim 8, wherein the liquid layer is in the form of a paste.

14. The liquid air electrode for a metal-air battery according to claim 1, wherein the liquid layer has been formed by mixing the electrolyte solution and the electrically conductive material to disperse the electrically conductive material in the electrolyte solution in a mixture, and then coating the mixture onto a support to form the layer.

15. The liquid air electrode for a metal-air battery according to claim 8, wherein the liquid layer has been formed by mixing the electrolyte solution, the binder and the electrically conductive material to disperse the electrically conductive material in the electrolyte solution in a mixture, and then coating the mixture onto a support to form the layer.

16. A metal-air battery comprising
an air electrode, the air electrode being the liquid air electrode for a metal-air battery according to claim 14;
a negative electrode; and
a solid electrolyte interposed between the air electrode and the negative electrode.

17. A metal-air battery comprising
an air electrode, the air electrode being the liquid air electrode for a metal-air battery according to claim 15;
a negative electrode; and
a solid electrolyte interposed between the air electrode and the negative electrode.

\* \* \* \* \*